US009343740B2

(12) United States Patent
Kaneko et al.

(10) Patent No.: US 9,343,740 B2
(45) Date of Patent: May 17, 2016

(54) LITHIUM ION BATTERY

(75) Inventors: Shinako Kaneko, Kanagawa (JP); Hitoshi Ishikawa, Kanagawa (JP); Yasutaka Kono, Kanagawa (JP); Yoko Hashizume, Kanagawa (JP)

(73) Assignee: NEC Energy Devices, Ltd., Sagamihara-shi, Kanagawa (JP)

( * ) Notice: Subject to any disclaimer, the term of this patent is extended or adjusted under 35 U.S.C. 154(b) by 977 days.

(21) Appl. No.: 13/186,995

(22) Filed: Jul. 20, 2011

(65) Prior Publication Data
US 2011/0274982 A1 Nov. 10, 2011

Related U.S. Application Data

(63) Continuation-in-part of application No. PCT/JP2010/050689, filed on Jan. 21, 2010.

(30) Foreign Application Priority Data

Jan. 23, 2009 (JP) ................................. 2009-012987

(51) Int. Cl.
*H01M 4/583* (2010.01)
*H01M 4/133* (2010.01)
*H01M 4/36* (2006.01)
*H01M 4/587* (2010.01)
*H01M 4/62* (2006.01)
*H01M 10/0525* (2010.01)
*H01M 10/0565* (2010.01)
*H01M 10/0566* (2010.01)
*H01M 10/0567* (2010.01)
*H01M 10/0569* (2010.01)
*H01M 10/0587* (2010.01)
*H01M 10/42* (2006.01)
*H01M 4/02* (2006.01)

(52) U.S. Cl.
CPC .............. *H01M 4/583* (2013.01); *H01M 4/133* (2013.01); *H01M 4/366* (2013.01); *H01M 4/587* (2013.01); *H01M 4/62* (2013.01); *H01M 10/0525* (2013.01); *H01M 10/0565* (2013.01); *H01M 10/0566* (2013.01); *H01M 10/0567* (2013.01); *H01M 10/0569* (2013.01); *H01M 10/0587* (2013.01); *H01M 10/4235* (2013.01); *H01M 2004/021* (2013.01); *H01M 2300/0045* (2013.01); *H01M 2300/0085* (2013.01); *Y02E 60/122* (2013.01); *Y02T 10/7011* (2013.01)

(58) Field of Classification Search
CPC ..... H01M 4/583; H01M 4/587; H01M 4/133; H01M 4/366; H01M 10/0569; H01M 10/0525; H01M 10/0565; H01M 10/0567; H01M 2004/027; Y02E 60/122
USPC ............... 429/231.8, 330, 332, 338, 341, 342
See application file for complete search history.

(56) References Cited

U.S. PATENT DOCUMENTS

| 5,849,434 A | 12/1998 | Miura et al. |
| 7,132,199 B2 | 11/2006 | Unoki et al. |
| 7,582,389 B2 | 9/2009 | Matsui et al. |
| 8,178,009 B2 | 5/2012 | Watanabe |
| 8,197,964 B2 | 6/2012 | Saito et al. |
| 2003/0096163 A1 | 5/2003 | Miyake et al. |
| 2007/0099085 A1 | 5/2007 | Choi et al. |
| 2009/0169992 A1 | 7/2009 | Ishiko et al. |
| 2009/0286157 A1* | 11/2009 | Chen et al. .................... 429/209 |
| 2010/0092869 A1* | 4/2010 | Kaneko et al. ................ 429/303 |

FOREIGN PATENT DOCUMENTS

| CN | 1148278 A | | 4/1997 |
| CN | 1591961 A | | 3/2005 |
| CN | 101087035 | * | 12/2007 |
| CN | 101087035 A | | 12/2007 |
| CN | 101214952 | * | 7/2008 |
| CN | 101214952 A | | 7/2008 |
| CN | 101345326 A | | 1/2009 |
| EP | 1 995 817 A1 | | 11/2008 |
| JP | 2001-006683 | * | 1/2001 |
| JP | 2001-006683 A | | 1/2001 |
| JP | 2001-313071 A | | 11/2001 |
| JP | 2001-345122 A | | 12/2001 |
| JP | 2002-198053 | * | 7/2002 |
| JP | 2002-198053 A | | 7/2002 |
| JP | 2002-373704 A | | 12/2002 |
| JP | 3426869 B2 | | 5/2003 |
| JP | 2003-288939 A | | 10/2003 |
| JP | 2003-331918 A | | 11/2003 |
| JP | 2004-185865 A | | 7/2004 |
| JP | 2005-26091 A | | 1/2005 |
| JP | 3774315 B2 | | 2/2006 |
| JP | 2006-85912 A | | 3/2006 |
| JP | 2007-95380 A | | 4/2007 |
| JP | 2007-134282 A | | 5/2007 |
| JP | 2007-207675 A | | 8/2007 |
| JP | 2007-329107 A | | 12/2007 |
| JP | 2008-108460 A | | 5/2008 |
| WO | WO 2008/056585 A1 | | 5/2008 |

OTHER PUBLICATIONS

Bup Ju Jeon et al. "Electrochemical characteristics of silicon coated graphite prepared by gas suspension spray method for anode material of lithium secondary batteries"; Korean Journal of Chemical Engineering (2006), 23 (5), pp. 854-859.*

Masashi Ishikawa et al., Pure Ionic Liquid Electrolytes Compatible With a Graphitized Carbon Negative Electrode in Rechargeable Lithium-Ion Batteries, Journal of Power Sources, vol. 162, 2006, pp. 658-662.

* cited by examiner

*Primary Examiner* — Laura Weiner

(74) *Attorney, Agent, or Firm* — Foley & Lardner LLP

(57) ABSTRACT

There is provided a lithium ion battery which maintains the flame retardancy of an electrolyte over a long period of time, has high energy density, and has improved charge/discharge cycle characteristics, high temperature storage characteristics, and rate characteristics. The lithium ion battery according to the present exemplary embodiment is a lithium ion battery comprising an electrolyte containing at least an ionic liquid and a lithium salt, a positive electrode, and a negative electrode, wherein the negative electrode includes a negative electrode active material which is a carbon material treated with a surface treatment agent.

10 Claims, 1 Drawing Sheet

LITHIUM ION BATTERY

This is a continuation-in-part of international application No. PCT/JP2010/050689, filed on Jan. 21, 2010, the disclosure of which is incorporated herein in its entirety by reference.

TECHNICAL FIELD

The present exemplary embodiment relates to a lithium ion battery which has high safety.

BACKGROUND ART

Since a lithium ion battery can achieve high energy density, it attracts attention as a power source for cellular phones and notebook personal computers, a large-scale power source for electric power storage, and a power source for motor vehicles.

Although a lithium ion battery can achieve high energy density, higher safety is required when it is increased in size. For example, a very high safety is required for the large-scale power source for electric power storage and the power source for motor vehicles, and although measures such as a structural design of a cell, a package, and the like, a protective circuit, an electrode material, an additive having an overcharge-preventing function, and the strengthening of a shutdown function of a separator have been taken as safety measures, thus giving sufficient consideration to safety and ensuring safety, one of the means for further increasing safety is the flame retardation of an electrolyte.

A lithium ion battery uses an aprotic solvent such as cyclic carbonate and linear carbonate as an electrolyte solvent, and these carbonates are characterized in that they have a high dielectric constant and high ionic conductivity of lithium ions, but have a low flash point and are flammable. Generally, cyclic carbonates are characterized in that they have a high dielectric constant and high viscosity, while linear carbonates are characterized in that they have a low dielectric constant and low viscosity. Therefore, these solvents are mixed for use in a lithium ion battery in accordance with the applications thereof.

On the other hand, a research of using as an electrolyte solvent an ionic liquid which assumes a liquid state at a certain temperature has been made. Since an ionic liquid is characterized in that it has very low inflammability because it does not have volatility and has high decomposition temperature, a research using an ionic liquid as an electrolyte of a lithium ion battery has been actively done.

In Patent Literature 1, an ionic liquid containing a 1-methyl-3-ethylimidazolium cation is used as an electrolyte solvent, and since this electrolyte solvent does not volatilize even under a high temperature environment of 120° C., it shows good characteristics. However, the ionic liquid containing this cation has low reduction stability and undergoes reductive decomposition at a potential of 1 V or less to $Li/Li^+$. Therefore, there has been a problem that the cycle characteristics of a battery are significantly reduced when a negative electrode is activated at 1 V or less to $Li/Li^+$. Therefore, it is necessary to use a negative electrode active material in which the action potential of the negative electrode is 1 V or more to $Li/Li^+$, and since the battery voltage is reduced in this case as compared with the case where a carbon negative electrode is used, high energy density is not obtained.

Patent Literature 2 describes that an ionic liquid having improved reduction stability which comprises at least one cation selected from the group consisting of N-methyl-N-ethyl pyrrolidinium, N-methyl-N-propyl pyrrolidinium, N-methyl-N-ethyl pyrrolidinium, and N-methyl-N-propyl piperidinium has excellent reduction stability even when the action potential of Li metal, Sn, or the like is 1 V or less to $Li/Li^+$, and that the characteristics of a battery in which Li metal is used as the negative electrode and $LiCoO_2$, is used as the positive electrode include high energy density and excellent storage characteristics and flame retardancy.

Patent Literature 3 discloses a 4 V class lithium secondary battery using an ionic liquid comprising a bis(fluorosulfonyl) imide anion, wherein a negative electrode active material in which insertion and elimination of Li are possible at a potential close to the oxidation-reduction potential of Li metal, for example, graphite, tin oxide, or a Si-based material such as $SiO_2$ is used.

Further, Non-Patent Literature 1 describes that an ionic liquid comprising a bis(fluorosulfonyl)imide anion allows insertion and elimination of Li ions on graphite.

However, Patent Literature 3 and Non-Patent Literature 1 only describe that charge and discharge is possible when graphite is used, but there has been a problem that sufficient capacity, rate characteristics, and cycle characteristics are not obtained because an ionic liquid with high viscosity has low impregnation into graphite.

On the other hand, although a carbon material is generally used as a negative electrode material of a lithium ion battery, it is known that a carbonate such as propylene carbonate in an electrolyte solvent undergoes reductive decomposition at about 1 V to Li/Li+ on the surface of graphite having high crystallinity to increase irreversible capacity to reduce charge/discharge efficiency and cycle characteristics. It is known that, on the surface of carbon having a very high degree of graphitization, a cyclic carbonate such as PC (propylene carbonate) is easily decomposed to cause reduction in cycle characteristics.

There has been a problem that an ionic liquid with high viscosity generally has a low impregnation into a porous material such as an electrode and a separator. In order to improve the impregnation into a porous material of an ionic liquid, a technique of mixing a carbonate to reduce the viscosity has been studied, for example, in Patent Literatures 4 and 5. Patent Literature 4 describes that a cyclic carbonate and/or a linear carbonate is mixed in an amount of 0.1 to 30% by volume, and Patent Literature 5 describes that a cyclic carbonate and/or a linear carbonate is mixed in an amount of 50% by volume or more. It is shown that mixing a cyclic carbonate and/or a linear carbonate having a lower viscosity than an ionic liquid reduces the viscosity of an electrolyte solvent, improves the impregnation into a porous material such as an electrode and a separator, and improves energy density. However, a cyclic carbonate has low reduction stability and is particularly apt to undergo reductive decomposition on the surface of graphite. Therefore, there has been a problem that the carbonate undergoes reductive decomposition on the surface of graphite while repeating the cycle, and characteristics such as cycle characteristics and storage characteristics are significantly reduced. Further, there has been a problem that even when an ionic liquid having low reduction stability is used, the ionic liquid undergoes reductive decomposition while repeating the cycle to significantly reduce battery characteristics.

A technique is known in which there is used, as an additive, a substance which undergoes reductive decomposition at a potential higher than a carbonate used as an electrolyte solvent to produce a protective film having high lithium ion permeability, SEI (Solid Electrolyte Interface). It is known that the control of the protective film is indispensable to achieve high performance of a negative electrode because the protective film has large influence on charge/discharge efficiency, cycle characteristics, and safety, and with respect to a carbon material and an oxide material, reduction in the irreversible capacity thereof is required.

Then, it is shown that irreversible capacity is reduced and capacity, cycle characteristics, and the like can be improved, while holding the flame retardancy of the electrolyte, by further incorporating an additive for forming a protective film on the surface of graphite. The following is open to the public as a technique using graphite. It is shown that the above improvement can be made by incorporating a cyclic ester having a π-bond such as vinylene carbonate, in Patent Literature 6; by incorporating a cyclic organic compound having an S=O bond such as 1,3-propane sultone, in Patent Literature 7; by incorporating a cyclic carbonate having a C=C unsaturated bond such as vinylethylene carbonate, in Patent Literature 8; and by incorporating a cyclic organic compound having an S=O bond such as 1,3-propane sultone and/or a cyclic carbonate having a π-bond such as vinylene carbonate, in Patent Literature 9.

However, since graphite has very high activity to decompose an electrolyte, it is necessary to add a large amount of protective film-forming substance as described in Patent Literatures 6 to 9, in order to form a protective film for obtaining good characteristics over a long period of time. There has been a problem that, when a large amount of additives is used, battery characteristics are reduced and charge/discharge efficiency is reduced due to the increase in resistance or the increase in irreversible capacity. Further, in Patent Literature 10, there is disclosed a technique of a negative electrode active material comprising a carbon material (hardly graphitizable carbon) in which the spacing of the (002) plane is 0.34 nm or more.

CITATION LIST

Patent Literature

Patent Literature 1: JP3426869B
Patent Literature 2: JP2003-331918A
Patent Literature 3: JP2007-207675A
Patent Literature 4: JP3774315B
Patent Literature 5: JP2003-288939A
Patent Literature 6: JP2002-373704A
Patent Literature 7: JP2005-026091A
Patent Literature 8: JP2006-085912A
Patent Literature 9: JP2007-134282A
Patent Literature 10: JP2008-108460A Non Patent Literature Non Patent Literature 1: J. Power Sources, vol. 162 (2006), pp. 658-662

SUMMARY OF INVENTION

Technical Problem

In order to obtain good battery characteristics, the impregnation of the electrolyte into the inner part of the electrode at the time of the first charge is very important for suppressing the reductive decomposition of electrolyte components. An ionic liquid generally has high viscosity, which makes the rapid impregnation of the ionic liquid into a porous inner part of the electrode difficult. Therefore, addition of an aprotic solvent has been tried to reduce the viscosity of the ionic liquid as described in Patent Literatures 4 to 9, but the impregnation into the inner part of the electrode is not yet sufficient.

When the impregnation into the carbon electrode which is a negative electrode active material is not uniform at the first charge, there has been a problem that lithium metal is easily precipitated on the negative electrode due to the shortage of the negative electrode capacity relative to the positive electrode capacity, which results in reduction in capacity and reduction in cycle characteristics, and further results in the concentration of current on the lithium metal part, so that micro short circuit and reductive decomposition of the electrolyte components can easily occur.

The SEI film is formed on the carbon which is the negative electrode active material at the first charge, but when the impregnation is not sufficient, the carbon is gradually impregnated with electrolyte, while repeating charge and discharge. However, there has been a problem that, since the additive for forming the SEI is consumed at the first charge or during several charges, no or only a small amount of additive remains in the electrolyte in the part which is impregnated after several charges, which prevents an adequate SEI from being formed and causes the electrolyte components to undergo reductive decomposition to thereby reduce cycle characteristics.

Although the electrolyte containing at least an ionic liquid and a lithium salt can be used even for the carbon electrode using only graphite particles as an active material, it is preferred to use graphite coated or adhered with amorphous carbon as an active material. However, there has been a problem that an impurity functional group such as a hydroxy group which is slightly present on a carbon surface is decomposed and gasified in a high temperature cycle over a long period of time and causes reduction in cell characteristics.

Further, reduction in the flame retardancy has been found in the electrolyte or gel electrolyte containing the ionic liquid which has undergone reductive decomposition, which is the problem as described above. When the ionic liquid has undergone reductive decomposition, it cannot maintain initial non-volatility and low inflammability. That is, there has been a problem that since the electrolyte components undergo reductive decomposition in the part where the SEI is not formed due to the unsatisfactory impregnation of the ionic liquid into a carbon material, the safety is reduced when cycles are repeated.

The present exemplary embodiment has been made in view of the above problems. An object of the present exemplary embodiment is to provide a lithium ion battery which maintains the flame retardancy of an electrolyte over a long period of time, has high energy density, and has improved charge-discharge cycle characteristics, high temperature storage characteristics, and rate characteristics.

Solution to Problem

Thus, as a result of intensive investigations, the persons who have accomplished the present exemplary embodiment have found that the above object can be achieved when the surface of a carbon material is treated with a surface treatment agent. Specifically, the present exemplary embodiment achieves the above object with a lithium ion battery using a pregel solution capable of forming an electrolyte or a gel electrolyte containing at least an ionic liquid and a lithium salt and a carbon material whose surface is improved with a surface treatment agent as a negative electrode active material included in the negative electrode.

The carbon material of the present exemplary embodiment preferably includes at least graphite particles in which the interlayer distance of the (002) plane is from 0.335 to 0.337 nm from the viewpoint of capacity. Further, the carbon material preferably includes graphite particles whose surface is coated or adhered with amorphous carbon. Further, the mass of the amorphous carbon with which the surface of the graphite particles is coated or adhered is preferably 1% by mass or more and 30% by mass or less of the negative electrode active material.

The surface treatment agent of the present exemplary embodiment may be a coupling agent, and further may include at least one selected from among a silane-based coupling agent, an aluminum-based coupling agent, and a titanium-based coupling agent, but is more preferably a silane-based coupling agent. Further, the negative electrode active material may be treated by the impregnation with the surface treatment agent, may be treated by coating, or may be formed by mixing the surface treatment agent into the slurry of the electrode active material.

Examples of the organic functional group of the surface treatment agent of the present exemplary embodiment include an alkyl group, an acryloyl group, a methacryloyl group, an epoxy group, and a vinyl group.

In the present exemplary embodiment, an aprotic solvent may be added in order to reduce the viscosity of the electrolyte.

In the present exemplary embodiment, a common additive may be further used in order to suppress the reductive decomposition of an ionic liquid or an aprotic solvent; more preferably, the electrolyte may contain a disulfonate ester or may contain vinylene carbonate or a derivative thereof.

Advantageous Effects of Invention

According to the present exemplary embodiment, it has been possible to significantly improve the impregnation of an ionic liquid by binding an organic functional group to the surface of a carbon material which is a negative electrode active material. Particularly, this effect has been verified by the organic functional group such as an alkyl group, an acryloyl group, a methacryloyl group, an epoxy group, and a vinyl group. Further, it has been found that when the surface treatment agent for binding the organic functional group is a silane-based coupling agent, an aluminum-based coupling agent, and a titanium-based coupling agent, the impregnation of an ionic liquid is further improved.

The reason of the above effect is because while an ionic liquid generally has low wettability on the surface of a carbon material, an electrolyte containing at least an ionic liquid and a lithium salt has a significantly reduced surface tension on the surface of a carbon material which is subjected to the above surface treatment.

According to the present exemplary embodiment, since the surface of a carbon material having a reduced surface tension against an electrolyte containing at least an ionic liquid and a lithium salt is easily impregnated with the electrolyte, the time from the liquid pouring to the first charge can be reduced, and the step of heating to promote impregnation or the like will be unnecessary or simple.

According to the present exemplary embodiment, the negative electrode capacity relative to the positive electrode capacity at the first charge will not be insufficient because the carbon electrode is sufficiently impregnated with the electrolyte; and the first charge/discharge efficiency can also be improved and the good cyclicity and rate characteristics over a long period of time can be obtained because side reactions such as lithium metal formation and reduction reaction of electrolyte components can be suppressed.

According to the present exemplary embodiment, since the carbon electrode is sufficiently impregnated with the electrolyte, the additive is uniformly decomposed on the surface of carbon at the first charge to form good SEI to suppress the reductive decomposition of electrolyte components such as an ionic liquid and an aprotic solvent, thus capable of obtaining good cyclicity and rate characteristics over a long period of time.

According to the present exemplary embodiment, since an impurity functional group such as a hydroxy group which is present on the surface of carbon in a very small amount is replaced by a surface modifier, the effect of removing the impurity functional group which remains on the surface of carbon is also exhibited, thereby capable of obtaining good cyclicity and rate characteristics over a long period of time.

According to the present exemplary embodiment, although the electrolyte containing at least an ionic liquid and a lithium salt can be used even for the carbon electrode using only graphite particles as an active material, it is preferred to use graphite coated or adhered with amorphous carbon as an active material. Since amorphous carbon is produced by sintering at a lower temperature than graphite, many impurity functional groups are present on the surface of carbon. Since this allows effective introduction of functional groups from a surface modifier, the impregnation of the electrolyte containing at least an ionic liquid and a lithium salt can also be significantly improved.

Further, since the reductive decomposition of an ionic liquid can be suppressed for the above reasons, it is possible to maintain the flame retardancy of an electrolyte or a gel electrolyte over a long period of time, and a battery with high safety can be obtained.

DESCRIPTION OF EMBODIMENTS

Figure 1:
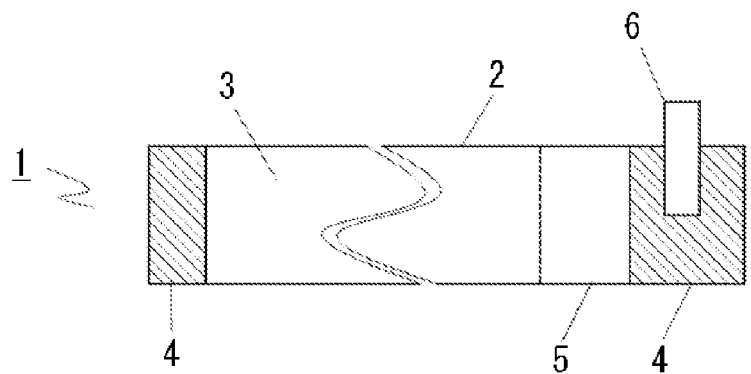
FIG. 1 is a drawing illustrating the configuration of the positive electrode of the lithium ion battery of the present exemplary embodiment.

Hereinafter, the configuration of the present exemplary embodiment will be described.

The lithium ion battery of the present exemplary embodiment comprises an electrolyte containing at least an ionic liquid and a lithium salt, a positive electrode, and a negative electrode including a negative electrode active material, wherein the negative electrode active material is a carbon material treated with a surface treatment agent. The impregnation of the electrolyte can be improved by treating a carbon material with a surface treatment agent. The treatment with a surface treatment agent includes treatment with a coupling agent, coating treatment with carbon having a different degree of graphitization, and coating treatment with a silicon-based material having good wettability, wherein treatment with a coupling agent is preferred.

Examples of the coupling agents include a silane-based coupling agent, an aluminum-based coupling agent, and a titanium-based coupling agent, wherein a silane-based coupling agent is particularly effective. Examples of the organic functional groups of these coupling agents include an alkyl group, an acryloyl group, a methacryloyl group, an epoxy group, a vinyl group, and an amino group. As the alkyl group, a linear or branched alkyl group having 1 to 10 carbons is preferred. Examples of the silane-based coupling agents include, but are not limited to, methyltrimethoxysilane, dimethyldimethoxysilane, trimethylmethoxysilane, methyltriethoxysilane, methyltriphenoxysilane, ethyltrimethoxysilane, n-propyltrimethoxysilane, diisopropyldimethoxysilane, isopropyltrimethoxysilane, n-hexyltrimethoxysilane, n-octyltrimethoxysilane, n-decyltrimethoxysilane, phenyltrimethoxysilane, diphenyldimethoxysilane, triphenylsilanol, methyltrichlorosilane, dimethyldichlorosilane, trimethylchlorosilane, n-octyldimethylchlorosilane, tetraethoxysilane, methylmethoxysiloxane, dimethylphenylmethoxysiloxane, alkylalkoxysiloxane, vinyltriacetoxysilane, vinyltrimethoxysilane, vinyltriethoxysilane, vinyltriisopropoxysilane, allyltrimethoxysilane, diallyldimethylsilane, 3-methacryloxypropyltrimethoxysilane, 3-methacryloxypropylmethyldimethoxysilane, 3-methacryloxypropyltriethoxysilane, 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane, 3-aminopropyltrimethoxysilane, 3-aminopropyltriethoxysilane, 3-(2-aminoethyl) aminopropyltrimethoxysilane, and 3-phenylaminopropylsilane. Further, the titanium-based coupling agents include, but are not limited to, isopropyltriisostearoyl titanate, isopropyltridodecylbenzenesulphonyl titanate, isopropyl tris(dioctylpyrophosphate)titanate, tetraisopropylbis(dioctylphosphite)titanate, tetraoctylbis(ditridecylphosphite)titanate, tetrakis(2-ethylhexyloxy)titanium, propanedioxytitanium bis(ethylacetoacetate), tri-n-butoxytitanium monostearate, (2-n-butoxycarbonylbenzoyloxy)tributoxytitanium, and di-n-butoxybis(triethanolaminato)titanium.

In the present exemplary embodiment, it is possible to use, for example, a silane-based coupling agent solution in which an aqueous acetic acid solution controlled to a pH of 4 to 7 contains the coupling agent as described above in an amount of 0.1 to 10% by mass, and thereto methyl alcohol or ethyl alcohol may be added in order to reduce viscosity. In addition, the solution may be diluted with a compatible solvent for adjusting concentration.

In the present exemplary embodiment, examples of the method of the surface treatment of a carbon material include, but are not limited to, (1) a method of impregnating a negative electrode substrate comprising a carbon material which is applied and dried on a current collector with a surface treatment agent solution by immersion, followed by condensation reaction between the negative electrode substrate and the surface treatment agent at a predetermined temperature (surface treatment method 1); or (2) a method of applying a surface treatment agent solution to a negative electrode substrate comprising a carbon material which is applied and dried on a current collector, followed by condensation reaction between the negative electrode substrate and the surface treatment agent at a predetermined temperature (surface treatment method 2); or (3) a method of impregnating a powdered carbon material with a surface treatment agent solution by immersion or spraying the surface treatment agent solution on the powdered carbon material, followed by condensation reaction between the carbon material and the surface treatment agent at a predetermined temperature (surface treatment method 3); or (4) a method of applying a carbon material slurry, to which a surface treatment agent solution is added, to a current collector followed by drying, followed by condensation reaction between the negative electrode substrate and the surface treatment agent at a predetermined temperature (surface treatment method 4).

In the lithium ion battery of the present exemplary embodiment, a carbon material is used as the negative electrode active material, and in particular, in the case where graphite is used, both artificial graphite and natural graphite can be used, and the graphite coated or adhered with amorphous carbon can also be used. Hardly graphitizable carbon having low crystallinity or the like can be used as other carbon materials, but when capacity is taken into consideration, a carbon material containing graphite is preferred. Graphite takes a layered, bulky, fibrous, spherical, or scaly shape, all of which can be used, and particularly preferred is the graphite in which the interlayer distance of the (002) plane is from 0.335 to 0.337 nm, when taking capacity into consideration.

Further, the amorphous carbon with which graphite is coated or adhered may completely coat the graphite or may partly coat the graphite. The methods of coating with amorphous carbon include, but are not limited to, a method of coating the surface of graphite particles with paraffin, olefin, fused polycyclic hydrocarbon compounds such as aromatic compounds, or organic polymer compounds such as a phenolic resin, an acrylic resin, and polyvinyl chloride, followed by heat treatment or the like to convert the compounds to amorphous carbon, and a method of gasifying organic compounds by thermal decomposition thereof and allowing the resulting gas to be adsorbed on the surface of graphite particles. Examples of the methods of coating with amorphous carbon include JP3335366B and JP3711726B.

The mass of the amorphous carbon with which the surface of the graphite particles is coated or adhered is preferably 1% by mass or more and 30% by mass or less of the negative electrode active material, from the viewpoint of capacity per volume of a battery.

Further, if the specific surface area of the carbon material as described above is too large, cycle degradation by elimination of particles accompanying charge and discharge may occur, and if the specific surface area is too small, it is hard to increase electrode density and particles may be destroyed during pressing. Therefore, the specific surface area of the carbon material is preferably from 0.4 to 1.8 $m^2/g$.

In the lithium ion battery of the present exemplary embodiment, examples of the positive electrode active material include lithium-containing composite oxides such as $LiCoO_2$, $LiNiO_2$, and $LiMn_2O_4$. Further, the transition metal moiety of these lithium-containing composite oxides may be replaced with other elements. Furthermore, a lithium-containing composite oxide having a plateau at 4.5 V or more of the metallic lithium counter electrode potential can also be used. Examples of the lithium-containing composite oxides include a spinel-type lithium-manganese composite oxide, an olivine-type lithium-containing composite oxide, and an inverse spinel-type lithium-containing composite oxide. The lithium-containing composite oxide may be a compound represented by, for example, $Li_a(M_xMn_{2-x})O_4$, wherein $0<x<2$ and $0<a<1.2$, and M is at least one selected from the group consisting of Ni, Co, Fe, Cr, and Cu.

The negative electrode and the positive electrode for the lithium ion battery of the present exemplary embodiment can be obtained by dispersing and kneading a negative electrode active material and a positive electrode active material, respectively, in a solvent such as N-methyl-2-pyrrolidone (NMP) together with an electric conduction auxiliary agent such as carbon black and a binder such as polyvinylidene fluoride (PVDF); and applying the resulting mixture to a substrate such as copper foil for the negative electrode active material and aluminum foil for the positive electrode active material.

The anions of the ionic liquid contained in the electrolyte of the lithium ion battery of the present exemplary embodiment include, but are not limited to, $PF_6^-$, $PF_3(C_2F_5)_3^-$, $PF_3(CF_3)_3^-$, $BF_4^-$, $BF_2(CF_3)_2^-$, $BF_3(CF_3)^-$, $N(FSO_2)_2^-$, $N(CF_3SO_2)_2^-$, $N(C_2F_5SO_2)_2^-$, and $CF_3SO_3^-$.

Examples of the cationic species of the ionic liquid of the lithium ion battery of the present exemplary embodiment include a quaternary ammonium cation, a phosphonium cation, and a sulfonium cation. Examples of the cations comprising an ammonium cation include, but are not limited to, N-methyl-N-propyl pyrrolidinium, N-methyl-N-butyl pyrrolidinium, N-methyl-N-propyl piperidinium, N-methyl-N-butyl piperidinium, tetraethylammonium, triethylmethylammonium, N,N,N-trimethyl-N-propylammonium, 1-butyl-3-methylimidazolium, 1-ethyl-3-methylimidazolium, 1-hexyl-3-methylimidazolium, 1-octyl-3-methylimidazolium, 1-ethyl-2,3-dimethylimidazolium, 1-butyl-2,3-dimethylimidazolium, 1-hexyl-2,3-dimethylimidazolium, 1-ethylpyridinium, 1-butylpyridinium, and 1-hexylpyridinium. The cations comprising a phosphonium cation include, but are not limited to, tributyl-n-octylphosphonium, tetraphenylphosphonium, tetraethylphosphonium, tetraethylphosphonium, tetra-n-octylphosphonium, methyltriphenylphosphonium, isopropyltriphenylphosphonium, methoxycarbonylmethyl(triphenyl)phosphonium, ethyltriphenylphosphonium, butyltriphenylphosphonium, and (1-naphthylmethyl)triphenyl phosphonium. The cations comprising a sulfonium cation include, but are not limited to, trimethylsulfonium, (2-carboxyethyl)dimethylsulfonium, diphenyl(methyl)sulfonium, tri-n-butylsulfonium, tri-p-tolylsulfonium, triphenylsulfonium, and cyclopropyldiphenylsulfonium.

Examples of the lithium salts contained in the electrolyte of the lithium ion battery of the present exemplary embodiment include, but are not limited to, $LiPF_6$, $LiBF_4$, $LiAsF_6$, $LiSbF_6$, $LiClO_4$, $LiAlCl_4$, and $LiN(C_pF_{2p+1}SO_2)(C_qF_{2q+1}SO_2)$, wherein p and q are positive integers. These may be used singly or may be used in combination of two or more.

The lithium ion battery of the present exemplary embodiment may include a gel electrolyte. Examples of the polymer components included in the gel electrolyte include a monomer having two or more polymerization groups per molecule which can be thermally polymerized, an oligomer, and a copolymerization oligomer. Examples of the gelling components include bifunctional acrylates such as ethylene glycol diacrylate, diethylene glycol diacrylate, triethylene glycol diacrylate, tetraethylene glycol diacrylate, propylene diacrylate, dipropylene diacrylate, tripropylene diacrylate, 1,3-butanediol diacrylate, 1,4-butanediol diacrylate, and 1,6-hexanediol diacrylate; trifunctional acrylates such as trimethylolpropane triacrylate and pentaerythritol triacrylate; tetrafunctional acrylates such as ditrimethylolpropane tetraacrylate and pentaerythritol tetraacrylate; and the above methacrylate monomers, which form acrylic polymers. Other gelling components include, but are not limited to, monomers such as urethane acrylates and urethane methacrylates, copolymer oligomers thereof, and copolymer oligomers with acrylonitrile.

Polymers which can be dissolved in plasticizers to cause gelling such as polyvinylidene fluoride, polyethylene oxide, polyacrylonitrile can also be used.

Polymer components are not limited to the above-mentioned monomers, oligomers, or polymers, but any gellable material can be used. Further, the gelling component is not limited to one monomer, oligomer, or polymer, but a mixture of two or more gelling components can also be used if needed.

Further, benzoins and peroxides can be used as a thermal polymerization initiator if needed, but the initiator is not limited to these.

The disulfonate ester contained in the electrolyte of the lithium ion battery of the present exemplary embodiment is preferably a compound represented by the following formula (1) or (2).

[Formula 1]

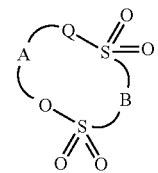

(1)

wherein Q represents an oxygen atom, a methylene group, or a single bond; A represents a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which contains an ether bond and may be branched, a substituted or unsubstituted perfluoroalkylene group having 1 to 6 carbon atoms which contains an ether bond and may be branched, or a substituted or unsubstituted fluoroalkylene group having 2 to 6 carbon atoms which contains an ether bond and may be branched; and B represents a substituted or unsubstituted alkylene group which may be branched, a substituted or unsubstituted fluoroalkylene group which may be branched, or an oxygen atom.

[Formula 2]

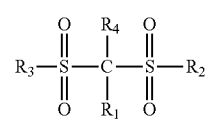

(2)

wherein $R_1$ and $R_4$ independently represent an atom or a group selected from among a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $—SO_2X_1$ (wherein $X_1$ represents a substituted or unsubstituted alkyl group having 1 to 5 carbon atoms), $—SY_1$ (wherein $Y_1$ represents a substituted or unsubstituted alkyl group having 1 to 5 carbon atoms), $—COZ$ (wherein Z represents a hydrogen atom or a substituted or unsubstituted alkyl group having 1 to 5 carbon atoms), and a halogen atom; and $R_2$ and $R_3$ independently represent an atom or a group selected from among a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxy group, a halogen atom, —$NX_2X_3$ (wherein $X_2$ and $X_3$ independently represent a hydrogen atom or a substituted or unsubstituted alkyl group having 1 to 5 carbon atoms), and —$NY_2CONY_3Y_4$ (wherein $Y_2$ to $Y_4$ independently represent a hydrogen atom or a substituted or unsubstituted alkyl group having 1 to 5 carbon atoms). A dimer of a compound represented by formula (2) may also be used.

Further, the representative examples of the compound represented by the above formula (1) are specifically illustrated in Table 1, and the representative examples of the compound represented by the above formula (2) are specifically illustrated in Table 2, but the present exemplary embodiment is not limited to these representative examples.

TABLE 1

| Compound No. | Chemical structure |
|---|---|
| 1 | (structure) |
| 2 | (structure with $(CH_2)_2$) |
| 3 | (structure with $(CH_2)_3$) |
| 4 | (structure with $CH_3$, CH, $(CH_2)_2$) |
| 5 | (structure) |
| 6 | (structure with F, F) |
| 7 | (structure) |
| 8 | (structure) |

TABLE 1-continued

| Compound No. | Chemical structure |
|---|---|
| 9 | (structure) |
| 10 | (structure) |
| 11 | (structure with F, F) |
| 12 | (structure) |
| 13 | (structure) |
| 14 | (structure with F, F) |
| 15 | (structure with $CF_2$) |
| 16 | (structure with $(CF_2)_2$) |
| 17 | (structure with $CF_2$) |

TABLE 1-continued

| Compound No. | Chemical structure |
|---|---|
| 18 | cyclic structure with two SO₂ groups, H₂C–O–CH₂–O–CH₂ linkage |
| 19 | cyclic structure with two SO₂ groups, F₂C–O–CF₂–O–CF₂ linkage |
| 20 | cyclic structure with two SO₂ groups, H₂C–O–CF₂–O–CH₂ linkage |
| 21 | 6-membered ring: O=S(=O)–O–S(=O)=O–O–CH₂–CH₂ |
| 22 | 5-membered ring: O=S(=O)–O–S(=O)=O–O–CH₂ |

TABLE 2

| Compound No. | Chemical structure |
|---|---|
| 101 | CH₃O–SO₂–CH₂–SO₂–OCH₃ |
| 102 | CH₃CH₂O–SO₂–CH₂–SO₂–OCH₂CH₃ |
| 103 | (CH₃)₂CH–SO₂–CH₂–SO₂–CH(CH₃)₂ |
| 104 | CH₃O–SO₂–CH(CH₃)–SO₂–OCH₃ |
| 105 | CH₃O–SO₂–C(CH₃)₂–SO₂–OCH₃ |
| 106 | CH₃–SO₂–CH₂–SO₂–OCH₂CH₂CH₃ |
| 107 | CH₃–SO₂–CH₂–SO₂–OCH₂CH₂Cl |
| 108 | CH₃O–SO₂–CH(OCH₃)–SO₂–OCH₃ |
| 109 | CH₃O–SO₂–CF₂–SO₂–OCH₃ |
| 110 | HO–SO₂–CH₂–SO₂–OCH₃ |
| 111 | Cl–SO₂–CH₂–SO₂–OCH₂CH₂OH |

TABLE 2-continued

| Compound No. | Chemical structure |
|---|---|
| 112 | ClSO₂CH₂—S(=O)₂—OCH₂CH₂OSCH₂SCl (structure with —S(=O)₂—Cl and —S(=O)₂—OCH₂CH₂OS(=O)₂CH₂S(=O)₂Cl) |
| 113 | CH(S(=O)₂—OCF₂CF₃)(S(=O)₂—OCF₂CF₃) |
| 114 | CH(S(=O)₂—NH₂)(S(=O)₂—NH₂) |
| 115 | CH(S(=O)₂—NH₂)(S(=O)₂—OC₆H₅) |
| 116 | CH(S(=O)₂—OC₆H₅)(S(=O)₂—OC₆H₅) |
| 117 | CH(S(=O)₂—NHCONH₂)(S(=O)₂—NHCONH₂) |
| 118 | O=CH—CH(S(=O)₂—OH)(S(=O)₂—OH) |
| 119 | CH₃—S(=O)₂—CH(S(=O)₂—OC₆H₅)(S(=O)₂—OC₆H₅) |
| 120 | CH₃CH₂—S—CH(S(=O)₂—OC₆H₅)(S(=O)₂—OC₆H₅) |

The compound represented by the above formula (1) or formula (2) can be obtained using the production method described in JP05-44946B.

The content of the compound represented by formula (1) or formula (2) in the electrolyte is not particularly limited, but it is preferably 0.005 to 20% by mass of the whole electrolyte. A sufficient effect of surface film can be obtained by setting the concentration of the compound represented by formula (1) or formula (2) to 0.005% by mass or more. More preferably, battery characteristics can be further improved by adding the compound in an amount of 0.01% by mass or more. Further, an increase in the viscosity of the electrolyte and an increase in the resistance accompanying it can be suppressed by setting the concentration of the compound represented by formula (1) or formula (2) to 20% by mass or less. More preferably, battery characteristics can be further improved by adding the compound in an amount of 5% by mass or less.

Optionally, vinylene carbonate (VC) or a derivative thereof can also be used for the lithium ion battery of the present exemplary embodiment. For example, the content of vinylene carbonate in the electrolyte is preferably 0.1% by mass or more and 10% by mass or less, more preferably 0.1% by mass or more and 5% by mass or less.

Optionally, 1,3-propanesultone (PS) or a derivative thereof can also be used for the lithium ion battery of the present exemplary embodiment. For example, the content of 1,3-propanesultone in the electrolyte is preferably 0.1% by mass or more and 10% by mass or less, more preferably 0.1% by mass or more and 5% by mass or less.

Optionally, other additives capable of forming SEI can also be used for the lithium ion battery of the present exemplary embodiment.

Optionally, an aprotic solvent can also be used for the lithium ion battery of the present exemplary embodiment. The aprotic solvents include, but are not limited to, at least one solvent selected from the group consisting of cyclic carbonates, linear carbonates, aliphatic carboxylates, γ-lactones, cyclic ethers, linear ethers, and any of fluorine derivatives thereof. Examples of the aprotic solvents include cyclic carbonates such as propylene carbonate (PC), ethylene carbonate (EC), butylene carbonate (BC), and vinylene carbonate (VC), linear carbonates such as dimethyl carbonate (DMC), diethyl carbonate (DEC), ethyl methyl carbonate (EMC), and dipropyl carbonate (DPC), aliphatic carboxylates such as methyl formate, methyl acetate, and ethyl propionate, γ-lactones such as γ-butyrolactone, linear ethers such as 1,2-ethoxyethane (DEE) and ethoxymethoxyethane (EME), cyclic ethers such as tetrahydrofuran and 2-methyltetrahydrofuran, dimethyl sulfoxide, 1,3-dioxolane, formamide, acetamide, dimethylformamide, acetonitrile, propylnitrile, nitromethane, ethyl monoglyme, trialkyl phosphates, trimethoxymethane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ether, N-methylpyrrolidone, fluorinated carboxylates, methyl-2,2,2-trifluoroethyl carbonate, methyl-2,2,3,3,3-pentafluoropropyl carbonate, trifluoromethyl ethylene carbonate, monofluoromethyl ethylene carbonate, difluoromethyl ethylene carbonate, 4,5-difluoro-1,3-dioxolan-2-one, and monofluoroethylene carbonate. These may be used singly or in combination of two or more. However, the aprotic solvents are not limited to these. When the aprotic solvent is contained in the electrolyte, the concentration of the aprotic solvent is 0.1% by mass or more and 80% by mass or less relative to the whole electrolyte.

For forming the lithium ion battery of the present exemplary embodiment, for example, a negative electrode and a positive electrode are laminated through a separator, or the laminated article is wound, and then the resulting article is housed in an outer packaging body such as a battery can or a flexible film made of a laminate of a synthetic resin and metal foil and impregnated with an electrolyte containing a compound represented by formula (1) or formula (2), an ionic liquid, and a lithium salt. Then, a surface film can be formed on the negative electrode by charging the battery before or after sealing the outer packaging body. Note that a separator which is generally used in a lithium-polymer battery and is porous, such as a nonwoven fabric, a polyolefin microporous film, a porous film in which inorganic particles such as Si are dispersed, a polyolefin microporous film which is subjected to hydrophilic treatment, and a porous film of fluororesin or the like, can be used as the above separator.

Examples of the shape of the lithium ion or lithium polymer battery according to the present exemplary embodiment include, but are not limited to, a cylindrical type, a square type, a laminate outer packaging type, and a coin type. In particular, in the laminate outer packaging type, the electrode includes a winding type and a lamination type.

EXAMPLES

The present exemplary embodiment will be described by Examples with reference to drawings, but the present exemplary embodiment is not limited to these Examples.

Figure 2:
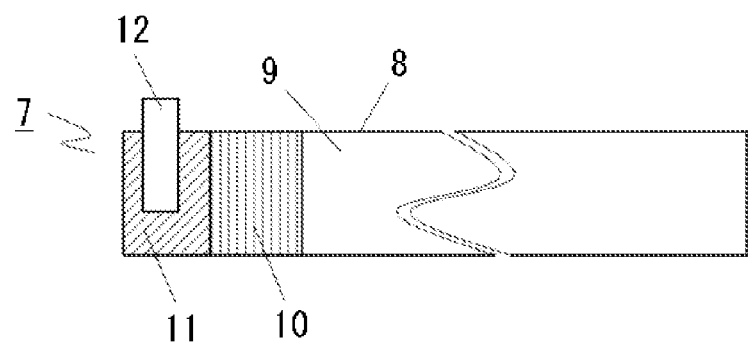
FIG. 2 is a drawing illustrating the configuration of the negative electrode of the lithium ion battery of the present exemplary embodiment.
Figure 3:
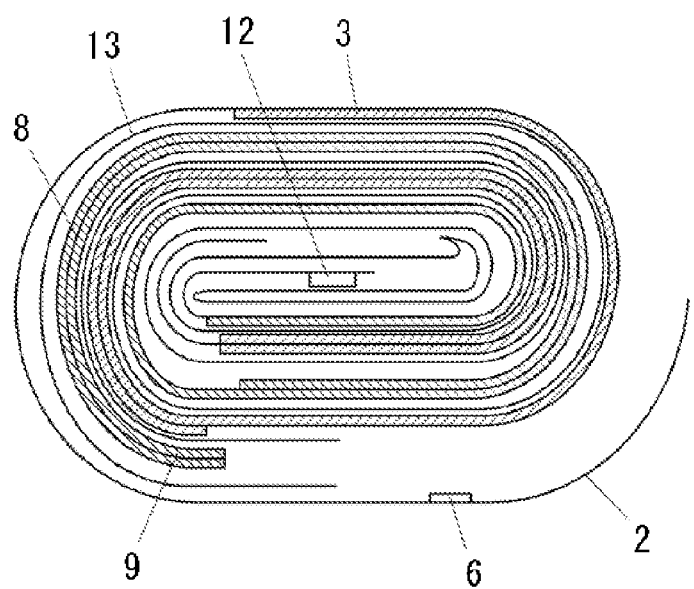
FIG. 3 is a drawing illustrating the configuration of the battery element after winding of the lithium ion battery of the present exemplary embodiment.

FIG. 1 is a drawing illustrating the configuration of the positive electrode of the lithium ion battery of Example 1 of the present exemplary embodiment. FIG. 2 is a drawing illustrating the configuration of the negative electrode of the lithium ion battery of Example 1 of the present exemplary embodiment. FIG. 3 is a sectional view illustrating the configuration of the battery element after winding of the lithium ion battery of Example 1 of the present exemplary embodiment.

Example 1

Production of a positive electrode will be described by using FIG. 1. To a mixture of 85% by mass of $LiMn_2O_4$, 7% by mass of acetylene black as an electric conduction auxiliary material, and 8% by mass of polyvinylidene fluoride as a binder was added N-methyl pyrrolidone, and the resulting mixture was further mixed to produce a positive electrode slurry. The resulting slurry was applied to both sides of Al foil 2 having a thickness of 20 μm which serves as a current collector by a doctor blade method so that the thickness after roll press treatment might be 160 μm to form a positive electrode active material applied part 3. Note that in both ends were provided positive electrode active material non-applied parts 4 to neither side of which was applied the positive electrode active material, and a positive electrode conductive tab 6 was provided in one of the positive electrode active material non-applied parts 4, adjacent to which was provided a positive electrode active material one-side applied part 5 to only one side of which was applied the positive electrode active material, thus forming a positive electrode 1.

Next, production of a negative electrode will be described by using FIG. 2. To a solution of 50% by mass of water which is adjusted to a pH of 4 with acetic acid and 50% by mass of methanol was added 0.5% by mass of ethyltrimethoxysilane (Z-6321) available from Dow Corning Toray Co., Ltd., and the resulting solution was used as a coupling agent solution. Then, 1 kg of the above solution was added to 1 kg of natural graphite in which the interlayer distance of the (002) plane is 0.336 nm, thoroughly mixing the mixture, followed by heat treatment at 130° C. for 2 hours, followed by vacuum drying at 80° C. for 12 hours, thus obtaining a carbon material of Example 1 (surface treatment method 3).

To a mixture of 90% by mass of graphite which has been subjected to the above silane coupling treatment and 10% by mass of polyvinylidene fluoride as a binder was added N-methyl pyrrolidone, and the resulting mixture was further mixed to produce a negative electrode slurry. The resulting slurry was applied to both sides of Cu foil 8 having a thickness of 10 μm which serves as a current collector so that the thickness after roll press treatment might be 120 μm and the electrode density might be 1.50 g/cc to form a negative electrode active material applied part 9. Note that in one of the both ends were provided a negative electrode active material one-side applied part 10 to only one side of which was applied the negative electrode active material and a negative electrode active material non-applied part 11 to which was not applied the negative electrode active material, and a negative electrode conductive tab 12 was attached to the negative electrode active material non-applied part 11, thus forming a negative electrode 7.

Production of a battery element will be described by using FIG. 3. Two separators 13 each made of a microporous film were welded and cut, wherein the microporous film was a polypropylene microporous film having a film thickness of 25 μm and a porosity of 55% and had been subjected to hydrophilic treatment. The cut part was fixed to the roll core of a winding device and wound, followed by introducing the tips of the positive electrode 1 (FIG. 1) and the negative electrode 7 (FIG. 2). The positive electrode 1 was arranged on the upper surface of the separator so that the opposite side to the joining part of the positive electrode conductive tab 6 was used as the tip side, and the negative electrode 7 was arranged between the two separators so that the joining part side of the negative electrode conductive tab 12 was used as the tip side. Then, the roll core was rotated to wind the electrodes and the separator to form a battery element (hereinafter, described as jelly roll (J/R)).

The J/R was housed in an embossed laminate outer packaging body; the positive electrode conductive tab 6 and the negative electrode conductive tab 12 were pulled out; one side of the laminate outer packaging body was folded up; and the laminate outer packaging body was thermally fused leaving a part for pouring liquid.

The electrolyte was produced by dissolving 0.7 mol/L of LiTFSI (bis(trifluoromethanesulfonyl)imidelithium) in 1-methyl-1-propylpiperidinium bis(fluorosulfonyl)imide (MPPp-FSI).

Next, the above electrolyte was poured from the liquid-pouring part of the laminate which was sealed leaving the liquid-pouring part; vacuum impregnation was performed; and the liquid-pouring part was thermally fused to obtain a battery.

The resulting battery was left standing for 2 hours at room temperature, followed by the CC-CV charge (charge conditions: a CC current of 0.02 C, a CV time of 5 hours, and a temperature of 20° C.) to a battery voltage of 4.2 V, followed by discharging at 0.02 C to a battery voltage of 3.0 V, and the resulting discharge capacity was defined as the initial capacity. The initial capacity at this time is shown in Table 3 as the ratio of the discharge capacity of Example 1 to the discharge capacity in the case where 1M $LiPF_6$ EC/DEC=3/7 (volume ratio) was used as an electrolyte in the above J/R.

The discharge capacity relative to the charge capacity at the first time is shown in Table 3 as the charge/discharge efficiency.

The ratio of 0.1 C capacity to 0.02 C capacity at 20° C. is shown in Table 3, as the rate characteristics of the resulting battery.

The cycle test of the resulting battery was performed using the CC-CV charge (at an upper limit voltage of 4.2 V, a current of 0.5 C, and a CV time of 1.5 hours) and the CC discharge (at a lower limit voltage of 3.0 V and a current of 0.5 C), and all of the tests were performed at 20° C. The capacity retention rate, which is the ratio of the discharge capacity at the 400th cycle to the discharge capacity at the first cycle, is shown in Table 3.

In the combustion test, the battery after the above cycle test was placed 10 cm above the tip of the flame of a gas burner, and from the state of evaporation and burning of the electrolyte solvent, the results were rated as follows: Electrolyte not ignited: A; ignited but extinguished in 2 to 3 seconds: B; ignited but extinguished within 10 seconds: C; not extinguished, kept burning: D.

Example 2

Amorphous carbon-coated graphite used as the negative electrode active material of Example 2 was produced as follows. A graphite particle/phenolic resin mixed solution was produced by impregnating and dispersing 100 g of natural graphite particles in which the interlayer distance of the (002) plane was 0.336 nm with 150 g of a phenolic resin solution in methanol (VP-13N manufactured by Hitachi Chemical Co., Ltd.; solid content adjusted to 15% by mass). The solution was filtered and dried to obtain graphite particles coated with phenolic resin. Subsequently, the phenolic resin-coated graphite particles were fired at 800° C. in nitrogen to carbonize the phenolic resin, thus obtaining graphite particles coated with about 3% by mass of amorphous carbon.

Other operations were performed in the same manner as in Example 1 except for using the graphite coated with 3% by mass of amorphous carbon as described above. That is, 1 kg of a coupling agent solution was mixed with 1 kg of amorphous carbon-coated graphite followed by heating the mixture in the same manner as in Example 1, thus obtaining a carbon material of Example 2 (surface treatment method 3). Subsequently, a negative electrode was produced in the same manner as in Example 1, and a battery was obtained using the same positive electrode, electrolyte, and the like as in Example 1, and the resulting battery was measured for capacity and the like. The results are shown in Table 3.

Example 3

In Example 3, a battery was obtained in the same manner as in Example 1 except that a phenolic resin solution in methanol having a solid content of 50% by mass was used and an amorphous carbon-coated graphite (having an amorphous carbon coating-amount of 10% by mass) coated in the same manner as in Example 2 was used as a carbon material, and the resulting battery was measured for capacity and the like. The results are shown in Table 3.

Example 4

In Example 4, a battery was obtained in the same manner as in Example 1 except that 100 g of graphite particles were impregnated with and dispersed in 300 g of a phenolic resin solution in methanol having a solid content of 50% by mass, and graphite coated with an amorphous carbon in the same manner as in Example 2 (having an amorphous carbon coating-amount of 20% by mass) was used as a carbon material, and the resulting battery was measured for capacity and the like. The results are shown in Table 3.

Example 5

In Example 5, a battery was obtained in the same manner as in Example 1 except that 100 g of graphite particles were impregnated with and dispersed in 300 g of a phenolic resin solution in methanol having a solid content of 70% by mass, and graphite coated with an amorphous carbon in the same manner as in Example 2 (having an amorphous carbon coating-amount of 30% by mass) was used as a carbon material, and the resulting battery was measured for capacity and the like. The results are shown in Table 3.

Example 6

The negative electrode of Example 6 was produced as follows. To a mixture of 90% by mass of a carbon material prepared by using graphite coated with 10% by mass of amorphous carbon which was not surface-treated (same as the carbon material used in Example 3) and 10% by mass of polyvinylidene fluoride as a binder was added N-methylpyrrolidone, and the resulting mixture was further mixed to produce a negative electrode slurry. The resulting slurry was applied to both sides of Cu foil having a thickness of 10 μm which serves as a current collector so that the thickness after roll press treatment might be 120 μm and the electrode density might be 1.50 g/cc to form a negative electrode. To a solution of 50% by mass of water which was adjusted to a pH of 4 with acetic acid and 50% by mass of methanol was added 0.5% by mass of ethyltrimethoxysilane (Z-6321) available from Dow Corning Toray Co., Ltd. to obtain a coupling agent solution, in which the above negative electrode was immersed and vacuum-impregnated for 2 minutes, followed by removing excess silane coupling solution and performing heat treatment at 130° C. for 2 hours. The heat treatment was followed by vacuum drying at 80° C. for 12 hours, thus obtaining a negative electrode (surface treatment method 1).

A battery was obtained by producing a battery element in the same manner as in Example 1 except for producing the negative electrode, and the resulting battery was measured for capacity and the like. The results are shown in Table 3.

Example 7

In Example 7, instead of immersing the negative electrode in the coupling solution in Example 6, the same silane coupling solution as Example 1 in an amount of 0.5 cc was sprayed on the upper surface of 100 $cm^2$ of a carbon negative electrode, and the opposite coating surface was also sprayed in the same manner. A negative electrode was obtained by performing in the same manner as in Example 6 except that the silane coupling solution was sprayed on the carbon electrode (surface treatment method 2). A battery was obtained by producing a battery element in the same manner as in Example 1 except for producing the negative electrode, and the resulting battery was measured for capacity and the like. The results are shown in Table 3.

Example 8

The negative electrode of Example 8 was produced as follows. To a mixture of 90% by mass of graphite coated with 10% by mass of amorphous carbon which was not surface-treated and 10% by mass of polyvinylidene fluoride as a binder was added N-methyl pyrrolidone, and the resulting mixture was further mixed to produce a negative electrode slurry, to which a coupling agent solution prepared in the same manner as in Example 1 was added in an amount of 10% by mass based on the slurry. The resulting slurry was applied to both sides of Cu foil 15 having a thickness of 10 μm which serves as a current collector so that the thickness after roll press treatment might be 120 μM and dried at 125° C. to perform surface treatment (surface treatment method 4). The electrode was sized to a length of 187 mm and a width of 44 mm and an uncoated part connected with the coated part was produced, and thereto a nickel tab was attached by ultrasonic welding to form a negative electrode.

A battery was obtained by producing a battery element in the same manner as in Example 1 except for producing the negative electrode, and the resulting battery was measured for capacity and the like. The results are shown in Table 3.

Comparative Example 1

In Comparative Example 1, a battery was obtained in the same manner as in Example 1 except for using graphite which was not surface-treated, and the resulting battery was measured for capacity and the like. The results are shown in Table 3.

Comparative Example 2

In Comparative Example 2, a battery was obtained in the same manner as in Example 3 except for using graphite coated with 10% by mass of amorphous carbon which was not surface-treated, and the resulting battery was measured for capacity and the like. The results are shown in Table 3.

TABLE 3

| | Negative electrode active material | Amorphous carbon coating-amount | Surface treatment agent | Surface treatment method | Ionic liquid | Additive | Standing method after pouring liquid |
|---|---|---|---|---|---|---|---|
| Example 1 | Graphite | None | Ethyltrimethoxysilane | 3 | MPPp-FSI | None | Room temperature-2 hours |
| Example 2 | Amorphous carbon-coated graphite | 1 mass % | Ethyltrimethoxysilane | 3 | MPPp-FSI | None | Room temperature-2 hours |
| Example 3 | Amorphous carbon-coated graphite | 10 mass % | Ethyltrimethoxysilane | 3 | MPPp-FSI | None | Room temperature-2 hours |
| Example 4 | Amorphous carbon-coated graphite | 20 mass % | Ethyltrimethoxysilane | 3 | MPPp-FSI | None | Room temperature-2 hours |
| Example 5 | Amorphous carbon-coated graphite | 30 mass % | Ethyltrimethoxysilane | 3 | MPPp-FSI | None | Room temperature-2 hours |
| Example 6 | Amorphous carbon-coated graphite | 10 mass % | Ethyltrimethoxysilane | 1 | MPPp-FSI | None | Room temperature-2 hours |
| Example 7 | Amorphous carbon-coated graphite | 10 mass % | Ethyltrimethoxysilane | 2 | MPPp-FSI | None | Room temperature-2 hours |
| Example 8 | Amorphous carbon-coated graphite | 10 mass % | Ethyltrimethoxysilane | 4 | MPPp-FSI | None | Room temperature-2 hours |
| Comparative Example 1 | Graphite | None | None | None | MPPp-FSI | None | Room temperature-2 hours |
| Comparative Example 2 | Amorphous carbon-coated graphite | 10 mass % | None | None | MPPp-FSI | None | Room temperature-2 hours |

| | Charge and discharge efficiency (%) | Initial capacity (%) | Rate characteristics (%) @0.1 C/0.02 C capacity | Capacity retention rate (%) @400th cycle | Combustibility |
|---|---|---|---|---|---|
| Example 1 | 96 | 85 | 85 | 68 | A |
| Example 2 | 95 | 91 | 89 | 69 | A |
| Example 3 | 92 | 88 | 94 | 81 | A |
| Example 4 | 91 | 86 | 93 | 81 | A |
| Example 5 | 87 | 81 | 93 | 82 | A |
| Example 6 | 90 | 85 | 89 | 79 | A |
| Example 7 | 90 | 81 | 89 | 80 | A |
| Example 8 | 88 | 75 | 82 | 69 | B |
| Comparative Example 1 | 57 | 47 | 73 | 26 | C |
| Comparative Example 2 | 65 | 58 | 82 | 65 | C |

The first charge/discharge efficiency and the initial capacity have been significantly improved by performing a surface treatment with a silane-based coupling agent. This is because the impregnation of an electrolyte containing an ionic liquid has been improved by the silane-based coupling agent treatment, and it is estimated that the initial capacity has been improved because the impregnation has been improved to the inside of electrode micropores.

Further, when the impregnation is low, the contact area between the electrolyte containing an ionic liquid and the negative electrode carbon will be small. This will reduces the negative electrode carbon region that can accept Li ions released from the positive electrode. This in turn precipitates Li and reduces efficiency. It is estimated that, in Examples, the improvement in the impregnation by the silane-based coupling agent treatment has increased the acceptance region, thereby increasing the first charge/discharge efficiency.

The treatment with a silane-based coupling agent increases the acceptance region of Li, which allows reduction in the precipitation of Li and the irreversible reaction accompanying it, thus capable of suppressing the increase in a resistance component on the surface of carbon. This in turn has probably improved the rate characteristics and cycle characteristics.

was changed from ethyltrimethoxysilane to vinyltriethoxysilane (Z-6075 manufactured by Dow Corning Toray Co., Ltd.), and the resulting battery was measured for capacity and the like. The results are shown in Table 4.

Example 11

In Example 11, a battery was obtained in the same manner as in Example 3 except that the silane-based coupling agent was changed from ethyltrimethoxysilane to 3-glycidoxypropyltrimethoxysilane (Z-6040 manufactured by Dow Corning Toray Co., Ltd.), and the resulting battery was measured for capacity and the like. The results are shown in Table 4.

Example 12

In Example 12, a battery was obtained in the same manner as in Example 3 except that, as the coupling agent, tetrakis (2-ethylhexyloxy)titanium (manufactured by Nippon Soda Co., Ltd.) was used instead of ethyltrimethoxysilane, and the resulting battery was measured for capacity and the like. The results are shown in Table 4.

TABLE 4

|  | Negative electrode active material | Amorphous carbon coating-amount | Surface treatment agent | Surface treatment method | Ionic liquid | Additive | Standing method after pouring liquid |
|---|---|---|---|---|---|---|---|
| Example 9 | Amorphous carbon-coated graphite | 10 mass % | Ethyltrimethoxysilane | 3 | MPP-FSI | None | Room temperature-2 hours |
| Example 10 | Amorphous carbon-coated graphite | 10 mass % | Vinyltriethoxysilane | 3 | MPPp-FSI | None | Room temperature-2 hours |
| Example 11 | Amorphous carbon-coated graphite | 10 mass % | 3-Glycidoxypropyltrimethoxysilane | 3 | MPPp-FSI | None | Room temperature-2 hours |
| Example 12 | Amorphous carbon-coated graphite | 10 mass % | Tetrakis(2-ethylhexyloxy)titanium | 3 | MPPp-FSI | None | Room temperature-2 hours |

|  | Charge and discharge efficiency (%) | Initial capacity (%) | Rate characteristics (%) @0.1 C/0.02 C capacity | Capacity retention rate (%) @400th cycle | Combustibility |
|---|---|---|---|---|---|
| Example 9 | 90 | 87 | 95 | 78 | A |
| Example 10 | 91 | 87 | 84 | 77 | A |
| Example 11 | 88 | 86 | 84 | 75 | A |
| Example 12 | 81 | 78 | 78 | 70 | B |

The improvement in the cycle characteristics has allowed the decomposition of the electrolyte to be suppressed and the safety over a long period of time to be maintained.

Example 9

In Example 9, a battery was obtained in the same manner as in Example 3 except for using an electrolyte produced by dissolving 0.7 mol/L of LiTFSI (bis(trifluoromethanesulfonyl)imidelithium) in 1-methyl-1-propylpyrrolidinium bis (fluorosulfonyl)imide (MPP-FSI), and the resulting battery was measured for capacity and the like. The results are shown in Table 4.

Example 10

In Example 10, a battery was obtained in the same manner as in Example 3 except that the silane-based coupling agent It is estimated that, also in the case where the coupling agent has been changed, the improvement in the impregnation has allowed improvement in the charge/discharge efficiency, initial capacity, rate characteristics, and cycle characteristics, and has also allowed the safety in the combustibility of the electrolyte to be maintained.

Example 13

In Example 13, a battery was obtained in the same manner as in Example 3 except that, after pouring the electrolyte, the battery was left standing at 45° C. for 2 hours instead of being left standing at room temperature for 2 hours, and the resulting battery was measured for capacity and the like. The results are shown in Table 5.

Example 14

In Example 14, a battery was obtained in the same manner as in Example 3 except that, after pouring the electrolyte, the battery was left standing at 45° C. for 10 hours instead of being left standing at room temperature for 2 hours, and the resulting battery was measured for capacity and the like. The results are shown in Table 5.

Example 15

In Example 15, a battery was obtained in the same manner as in Example 3 except that 3% by mass of vinylene carbonate was added as an additive to the electrolyte, and the resulting battery was measured for capacity and the like. The results are shown in Table 5.

Example 16

In Example 16, a battery was obtained in the same manner as in Example 3 except that 2% by mass of a disulfonate ester compound No. 2 was added as an additive to the electrolyte, and the resulting battery was measured for capacity and the like. The results are shown in Table 5.

Example 17

In Example 17, a battery was obtained in the same manner as in Example 3 except that 3% by mass of 1,3-propanesultone was added as an additive to the electrolyte, and the resulting battery was measured for capacity and the like. The results are shown in Table 5.

Example 18

In Example 18, a battery was obtained in the same manner as in Example 16 except that, after pouring the electrolyte, the battery was left standing at 45° C. for 2 hours instead of being left standing at room temperature for 2 hours, and the resulting battery was measured for capacity and the like. The results are shown in Table 5.

Example 19

In Example 19, a battery was obtained in the same manner as in Example 16 except that, after pouring the electrolyte, the battery was left standing at 45° C. for 10 hours instead of being left standing at room temperature for 2 hours, and the resulting battery was measured for capacity and the like. The results are shown in Table 5.

Comparative Example 3

In Comparative Example 3, a battery was obtained in the same manner as in Example 13 except for using graphite coated with 10% by mass of amorphous carbon which was not surface-treated, and the resulting battery was measured for capacity and the like. The results are shown in Table 5.

Comparative Example 4

In Comparative Example 4, a battery was obtained in the same manner as in Example 14 except for using graphite coated with 10% by mass of amorphous carbon which was not surface-treated, and the resulting battery was measured for capacity and the like. The results are shown in Table 5.

Comparative Example 5

In Comparative Example 5, a battery was obtained in the same manner as in Example 15 except for using graphite coated with 10% by mass of amorphous carbon which was not surface-treated, and the resulting battery was measured for capacity and the like. The results are shown in Table 5.

Comparative Example 6

In Comparative Example 6, a battery was obtained in the same manner as in Example 16 except for using graphite coated with 10% by mass of amorphous carbon which was not surface-treated, and the resulting battery was measured for capacity and the like. The results are shown in Table 5.

Comparative Example 7

In Comparative Example 7, a battery was obtained in the same manner as in Example 17 except for using graphite coated with 10% by mass of amorphous carbon which was not surface-treated, and the resulting battery was measured for capacity and the like. The results are shown in Table 5.

Comparative Example 8

In Comparative Example 8, a battery was obtained in the same manner as in Example 19 except for using graphite coated with 10% by mass of amorphous carbon which was not surface-treated, and the resulting battery was measured for capacity and the like. The results are shown in Table 5.

TABLE 5

|  | Negative electrode active material | Amorphous carbon coating-amount | Surface treatment agent | Surface treatment method | Ionic liquid | Additive | Standing method after pouring liquid |
|---|---|---|---|---|---|---|---|
| Example 13 | Amorphous carbon-coated graphite | 10 mass % | Ethyltrimethoxysilane | 3 | MPPp-FSI | None | 45° C.-2 hours |
| Example 14 | Amorphous carbon-coated graphite | 10 mass % | Ethyltrimethoxysilane | 3 | MPPp-FSI | None | 45° C.-10 hours |
| Example 15 | Amorphous carbon-coated graphite | 10 mass % | Ethyltrimethoxysilane | 3 | MPPp-FSI | VC3% | Room temperature-2 hours |
| Example 16 | Amorphous carbon-coated graphite | 10 mass % | Ethyltrimethoxysilane | 3 | MPPp-FSI | Disulfonate ester 2% | Room temperature-2 hours |

TABLE 5-continued

| | | | | | | | |
|---|---|---|---|---|---|---|---|
| Example 17 | Amorphous carbon-coated graphite | 10 mass % | Ethyltrimethoxysilane | 3 | MPPp-FSI | PS3 mass % | Room temperature-2 hours |
| Example 18 | Amorphous carbon-coated graphite | 10 mass % | Ethyltrimethoxysilane | 3 | MPPp-FSI | Disulfonate ester 2% | 45° C.-2 hours |
| Example 19 | Amorphous carbon-coated graphite | 10 mass % | Ethyltrimethoxysilane | 3 | MPPp-FSI | Disulfonate ester 2% | 45° C.-10 hours |
| Comparative Example 3 | Amorphous carbon-coated graphite | 10 mass % | None | None | MPPp-FSI | None | 45° C.-2 hours |
| Comparative Example 4 | Amorphous carbon-coated graphite | 10 mass % | None | None | MPPp-FSI | None | 45° C.-10 hours |
| Comparative Example 5 | Amorphous carbon-coated graphite | 10 mass % | None | None | MPPp-FSI | VC3% | Room temperature-2 hours |
| Comparative Example 6 | Amorphous carbon-coated graphite | 10 mass % | None | None | MPPp-FSI | Disulfonate ester 2% | Room temperature-2 hours |
| Comparative Example 7 | Amorphous carbon-coated graphite | 10 mass % | None | None | MPPp-FSI | PS3 mass % | Room temperature-2 hours |
| Comparative Example 8 | Amorphous carbon-coated graphite | 10 mass % | None | None | MPPp-FSI | Disulfonate ester 2% | 45° C.-10 hours |

| | Charge and discharge efficiency (%) | Initial capacity (%) | Rate characteristics (%) @0.1 C/0.02 C capacity | Capacity retention rate (%) @400th cycle | Combustibility |
|---|---|---|---|---|---|
| Example 13 | 90 | 90 | 93 | 80 | A |
| Example 14 | 89 | 92 | 95 | 82 | A |
| Example 15 | 86 | 87 | 92 | 84 | A |
| Example 16 | 83 | 88 | 95 | 88 | A |
| Example 17 | 85 | 90 | 92 | 83 | A |
| Example 18 | 83 | 89 | 95 | 82 | A |
| Example 19 | 82 | 88 | 95 | 82 | A |
| Comparative Example 3 | 82 | 77 | 82 | 72 | C |
| Comparative Example 4 | 89 | 90 | 83 | 78 | B |
| Comparative Example 5 | 61 | 60 | 80 | 65 | C |
| Comparative Example 6 | 62 | 59 | 77 | 69 | C |
| Comparative Example 7 | 64 | 61 | 81 | 74 | C |
| Comparative Example 8 | 85 | 84 | 75 | 82 | A |

Although the impregnation of the electrolyte was improved by leaving the battery at 45° C. after pouring the electrolyte, the effect of leaving the battery at 45° C. in the present Examples was smaller than that in Comparative Examples. This is because the impregnation has already been improved by coupling agent treatment, which was effective in that the present exemplary embodiment can simplify the process.

The initial capacity and cycle characteristics have been improved by adding an additive capable of forming SEI. This is because the film has been effectively formed at the first charge due to the improvement in the impregnation of the electrolyte by the coupling agent treatment. On the other hand, in Comparative Examples, since the impregnation of the electrolyte is low, a region which is in contact with the negative electrode carbon and a region which is not in contact with it are present. This prevents the formation of uniform SEI. Further, the electrolyte is decomposed in the part which is impregnated after repeating charge and discharge. These are the reasons that cycle characteristics are reduced and the safety cannot be maintained.

Example 20

In Example 20, an aprotic solvent was added to the electrolyte. A battery was obtained in the same manner as in Example 3 except that 1M $LiPF_6$ EC/DEC/MPPp-FSI-1.5/3.5/5 (volume ratio) was used as an electrolyte, and the resulting battery was measured for capacity and the like. The results are shown in Table 6.

Example 21

In Example 21, a battery was obtained in the same manner as in Example 20 except that 3% by mass of vinylene carbonate was added as an additive to the electrolyte, and the resulting battery was measured for capacity and the like. The results are shown in Table 6.

Example 22

In Example 22, a battery was obtained in the same manner as in Example 20 except that 2% by mass of a disulfonate ester compound No. 2 was added as an additive to the electrolyte, and the resulting battery was measured for capacity and the like. The results are shown in Table 6.

Example 23

In Example 23, a battery was obtained in the same manner as in Example 20 except that 3% by mass of 1,3-propanesultone was added as an additive to the electrolyte, and the resulting battery was measured for capacity and the like. The results are shown in Table 6.

Example 24

In Example 24, a battery was obtained in the same manner as in Example 22 except that 1-methyl-1-propylpyrrolidinium bis(fluoromethanesulfonyl)imide (MPP-TFSI) was used as the electrolyte instead of 1-methyl-1-propylpiperidinium bis(fluorosulfonyl)imide (MPPp-FSI), and the resulting battery was measured for capacity and the like. The results are shown in Table 6.

Comparative Example 9

In Comparative Example 9, a battery was obtained in the same manner as in Example 22 except for using graphite coated with 10% by mass of amorphous carbon which was not surface-treated, and the resulting battery was measured for capacity and the like. The results are shown in Table 6.

Comparative Example 10

In Comparative Example 10, a battery was obtained in the same manner as in Example 24 except for using graphite coated with 10% by mass of amorphous carbon which was not surface-treated, and the resulting battery was measured for capacity and the like. The results are shown in Table 6.

TABLE 6

| | Negative electrode active material | Amorphous carbon coating-amount | Surface treatment agent | Surface treatment method | Ionic liquid | Additive | Standing method after pouring liquid |
|---|---|---|---|---|---|---|---|
| Example 20 | Amorphous carbon-coated graphite | 10 mass % | Ethyltrimethoxysilane | 3 | MPPp-FSI | None | Room temperature-2 hours |
| Example 21 | Amorphous carbon-coated graphite | 10 mass % | Ethyltrimethoxysilane | 3 | MPPp-FSI | VC3% | Room temperature-2 hours |
| Example 22 | Amorphous carbon-coated graphite | 10 mass % | Ethyltrimethoxysilane | 3 | MPPp-FSI | Disulfonate ester 2% | Room temperature-2 hours |
| Example 23 | Amorphous carbon-coated graphite | 10 mass % | Ethyltrimethoxysilane | 3 | MPPp-FSI | PS3 mass % | Room temperature-2 hours |
| Example 24 | Amorphous carbon-coated graphite | 10 mass % | Ethyltrimethoxysilane | 3 | MPP-TFSI | Disulfonate ester 2% | Room temperature-2 hours |
| Comparative Example 9 | Amorphous carbon-coated graphite | 10 mass % | None | None | MPPp-FSI | Disulfonate ester 2% | Room temperature-2 hours |
| Comparative Example 10 | Amorphous carbon-coated graphite | 10 mass % | None | None | MPPp-TFSI | Disulfonate ester 2% | Room temperature-2 hours |

| | Charge and discharge efficiency (%) | Initial capacity (%) | Rate characteristics (%) @0.1 C/0.02 C capacity | Capacity retention rate (%) @400th cycle | Combustibility |
|---|---|---|---|---|---|
| Example 20 | 79 | 86 | 93 | 76 | B |
| Example 21 | 82 | 88 | 95 | 79 | B |
| Example 22 | 80 | 88 | 91 | 83 | B |
| Example 23 | 81 | 85 | 89 | 77 | B |
| Example 24 | 82 | 84 | 85 | 85 | B |
| Comparative Example 9 | 76 | 73 | 83 | 77 | C |
| Comparative Example 10 | 78 | 76 | 79 | 79 | C |

The impregnation has been improved by the effect of treatment with a coupling agent also in the case where an aprotic solvent is mixed, which has improved the initial capacity, has also improved the cycle characteristics, and has also allowed the safety over a long period of time to be maintained. Further, the same effect has been observed when the anion species of an ionic liquid are changed.

Example 25

Example 25 was performed in the same manner as in Example 3 except that the electrolyte in Example 3 was replaced by a gel electrolyte. First, a pregel solution was produced by adding triethylene glycol diacrylate and trimethylolpropane triacrylate in an amount of 3.8% by mass and 1% by mass, respectively, as gelling agents, to an electrolyte prepared by mixing MPPp-FSI as an ionic liquid and 0.7 mol/L of LiTFSI as a lithium salt, thoroughly mixing the mixture, and then mixing t-butylperoxypivalate in an amount of 0.5% by mass as a polymerization initiator.

Next, a battery was obtained in the same manner as in Example 3 except that the pregel solution was poured from the liquid-pouring part, vacuum-impregnated, left standing at 45° C. for 2 hours, and then polymerized at 80° C. for 2 hours, and the resulting battery was measured for capacity and the like. The results are shown in Table 7.

Comparative Example 11

In Comparative Example 11, a battery was obtained in the same manner as in Example 25 except that the carbon in Example 25 was replaced by amorphous carbon-coated graphite which was not surface-treated, and the resulting battery was measured for capacity and the like. The results are shown in Table 7.

TABLE 7

| | Negative electrode active material | Amorphous carbon coating-amount | Surface treatment agent | Surface treatment method | Ionic liquid | Additive | Standing method after pouring liquid |
|---|---|---|---|---|---|---|---|
| Example 25 | Amorphous carbon-coated graphite | 10 mass % | Ethyltrimethoxysilane | 3 | MPPp-FSI | Disulfonate ester 2% | 45° C.-2 hours |
| Comparative Example 11 | Amorphous carbon-coated graphite | 10 mass % | None | None | MPPp-FSI | Disulfonate ester 2% | 45° C.-2 hours |

| | Charge and discharge efficiency (%) | Initial capacity (%) | Rate characteristics (%) @0.1 C/0.02 C capacity | Capacity retention rate (%) @400th cycle | Combustibility |
|---|---|---|---|---|---|
| Example 25 | 85 | 87 | 89 | 85 | A |
| Comparative Example 11 | 62 | 76 | 75 | 71 | B |

The effect of the surface treatment of carbon with a coupling agent has been obtained also in the case where the electrolyte has been allowed to gel, which has provided good capacity and cycle characteristics and allowed the safety over a long period of time to be maintained.

In the present exemplary embodiment, as a result of significant improvement in the wettability between the surface of a surface-treated carbon electrode and an ionic liquid, the process after pouring liquid has been able to be simplified, and the charge/discharge efficiency, rate characteristics, cycle characteristics, and safety over a long period of time have been able to be maintained.

INDUSTRIAL APPLICABILITY

The present exemplary embodiment can be utilized for a lithium ion battery, and can be further utilized to a double layer capacitor using an ionic liquid and a lithium ion capacitor using an ionic liquid.

REFERENCE SIGNS LIST

1 Positive electrode
2 Al foil
3 Positive electrode active material applied part
4 Positive electrode active material non-applied part
5 Positive electrode active material one-side applied part
6 Positive electrode conductive tab
7 Negative electrode
8 Cu foil
9 Negative electrode active material applied part
10 Negative electrode active material one-side applied part
11 Negative electrode active material non-applied part
12 Negative electrode conductive tab
13 Separator

The invention claimed is:

1. A lithium ion battery comprising an electrolyte containing at least an ionic liquid and a lithium salt, a positive electrode, and a negative electrode including a negative electrode active material,
    wherein the negative electrode active material is a carbon material treated with a surface treatment agent, and
    wherein the surface treatment agent is ethyltrimethoxysilane.

2. The lithium ion battery according to claim 1, wherein the carbon material of the negative electrode active material includes at least graphite particles in which the interlayer distance of the (002) plane is from 0.335 to 0.337 nm.

3. The lithium ion battery according to claim 1, wherein the carbon material of the negative electrode active material is graphite particles whose surface is coated or adhered with amorphous carbon.

4. The lithium ion battery according to claim 3, wherein the mass of the amorphous carbon with which the surface of the graphite particles is coated or adhered is 1% by mass or more and 30% by mass or less of the negative electrode active material.

5. The lithium ion battery according to claim 1, wherein the specific surface area of the carbon material of the negative electrode active material is 0.4 to 1.8 m2/g.

6. The lithium ion battery according to claim 1, wherein the electrolyte comprises an aprotic solvent.

7. The lithium ion battery according to claim 1, wherein the electrolyte contains a disulfonate ester.

8. The lithium ion battery according to claim 1, wherein the electrolyte contains vinylene carbonate or a derivative thereof.

9. The lithium ion battery according to claim 1, wherein the electrolyte contains 1,3-propanesultone or a derivative thereof.

10. The lithium ion battery according to claim 1, wherein the electrolyte has gelled with a polymer.

* * * * *